US012598183B2

(12) United States Patent　　(10) Patent No.: US 12,598,183 B2
Johnston et al.　　(45) Date of Patent: Apr. 7, 2026

(54) CREATING GRAPHICAL MODELS OF NETWORK SECURITY POLICIES AND DISPLAYING ON A NETWORK TOPOLOGY GRAPH

(71) Applicant: Cisco Technology, Inc., San Jose, CA (US)

(72) Inventors: Jay Kemper Johnston, Raleigh, NC (US); Michael Chomicz, Toronto (CA); David Alexander Pryor, Clayton, NC (US); Radoslaw Konrad Ruchala, Malopolskie (PL); Jan Stanislaw Krupa, Malopolska (PL)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 18/127,990

(22) Filed: Mar. 29, 2023

(65) Prior Publication Data

US 2024/0305640 A1　Sep. 12, 2024

Related U.S. Application Data

(60) Provisional application No. 63/451,190, filed on Mar. 9, 2023.

(51) Int. Cl.
*H04L 9/40*　(2022.01)
*H04L 41/22*　(2022.01)

(52) U.S. Cl.
CPC ............ *H04L 63/101* (2013.01); *H04L 41/22* (2013.01); *H04L 63/20* (2013.01)

(58) Field of Classification Search
CPC ... H04L 63/101; H04L 63/20; H04L 41/0894; H04L 41/22
See application file for complete search history.

(56) References Cited

U.S. PATENT DOCUMENTS 6,687,832 B1 *　2/2004　Harada .................. H04L 41/12
　　　　　　　　　　　　　　　　　726/22
7,567,560 B1 *　7/2009　Balasubramaniyan .....................
　　　　　　　　　　　　　　　　　H04L 63/0263
　　　　　　　　　　　　　　　　　370/395.2

(Continued)

OTHER PUBLICATIONS

Juniper Space Network Director. https://www.juniper.net/documentation/us/en/software/network-director5.1/network-director/topics/task/topology-view-setting-up-managing.html. (Year: 2021).*

(Continued)

*Primary Examiner* — John M Macilwinen
(74) *Attorney, Agent, or Firm* — Lee & Hayes, P.C.

(57) ABSTRACT

Techniques and architecture are described for abstracting a real physical twin network wherein security policies are mapped as an overlay on a graphical representation of the network topology. The techniques include receiving, at a computing device, a first security policy) for a first network device. The computing device processes the first security policy to generate a plurality of first access control entries. The computing device creates first graph nodes corresponding to the first access control entries. Based at least in part on a processing order of the first security policy on the first network device, the computing device links the first graph nodes into a graph. The computing device displays the graph on a display, wherein the graph is displayed as an overlay on a network topology graph that includes the first network device.

20 Claims, 7 Drawing Sheets

(56) References Cited

U.S. PATENT DOCUMENTS

| | | | |
|---|---|---|---|
| 7,904,642 B1 * | 3/2011 | Gupta | G06F 16/90339 |
| | | | 711/108 |
| 9,467,455 B2 * | 10/2016 | Seiver | H04L 41/12 |
| 9,948,679 B2 * | 4/2018 | Siswick | G06F 3/04842 |
| 11,245,728 B1 | 2/2022 | Curtis et al. | |
| 2006/0072456 A1 * | 4/2006 | Chari | H04L 41/22 |
| | | | 370/230 |
| 2008/0301765 A1 * | 12/2008 | Nicol | H04L 41/142 |
| | | | 726/1 |
| 2010/0179945 A1 * | 7/2010 | Rangarajan | G06F 16/2365 |
| | | | 707/694 |
| 2013/0298184 A1 | 11/2013 | Ermagan et al. | |
| 2017/0177648 A1 | 6/2017 | Obbard | |
| 2018/0309632 A1 | 10/2018 | Kompella et al. | |
| 2018/0351791 A1 * | 12/2018 | Nagarajan | H04L 12/4641 |
| 2019/0327271 A1 * | 10/2019 | Saxena | H04L 41/0895 |
| 2020/0177638 A1 * | 6/2020 | Salman | H04L 63/0263 |
| 2020/0412763 A1 * | 12/2020 | Mercian | H04L 41/22 |
| 2022/0060445 A1 * | 2/2022 | Kovenat | H04L 63/0209 |
| 2023/0353462 A1 * | 11/2023 | Cho | H04L 41/122 |
| 2024/0259429 A1 * | 8/2024 | Monni | H04L 63/101 |

OTHER PUBLICATIONS

Li, Liang, et al. "Research on modeling for network security policy confliction based on network topology." 2017 14th International Computer Conference on Wavelet Active Media Technology and Information Processing (ICCWAMTIP). IEEE. (Year: 2017).*

Lee, Seungsoo, et al. "A framework for policy inconsistency detection in software-defined networks." IEEE/ACM Transactions on Networking 30.3: 1410-1423. (Year: 2022).*

* cited by examiner

200B

Network 102

FIREWALL 202A

HOSTED_ON

INTERFACE 204A

APPLIED_TO

OUTSIDE_IN 206A

NEXT_ENTRY

ACE 208A

NEXT_ENTRY

ACE 208B

NEXT_ENTRY

ACE 208C

TARGET

WEBSERVER 210

NEXT_ENTRY

ACE (DROP) 208D

300 ⟍

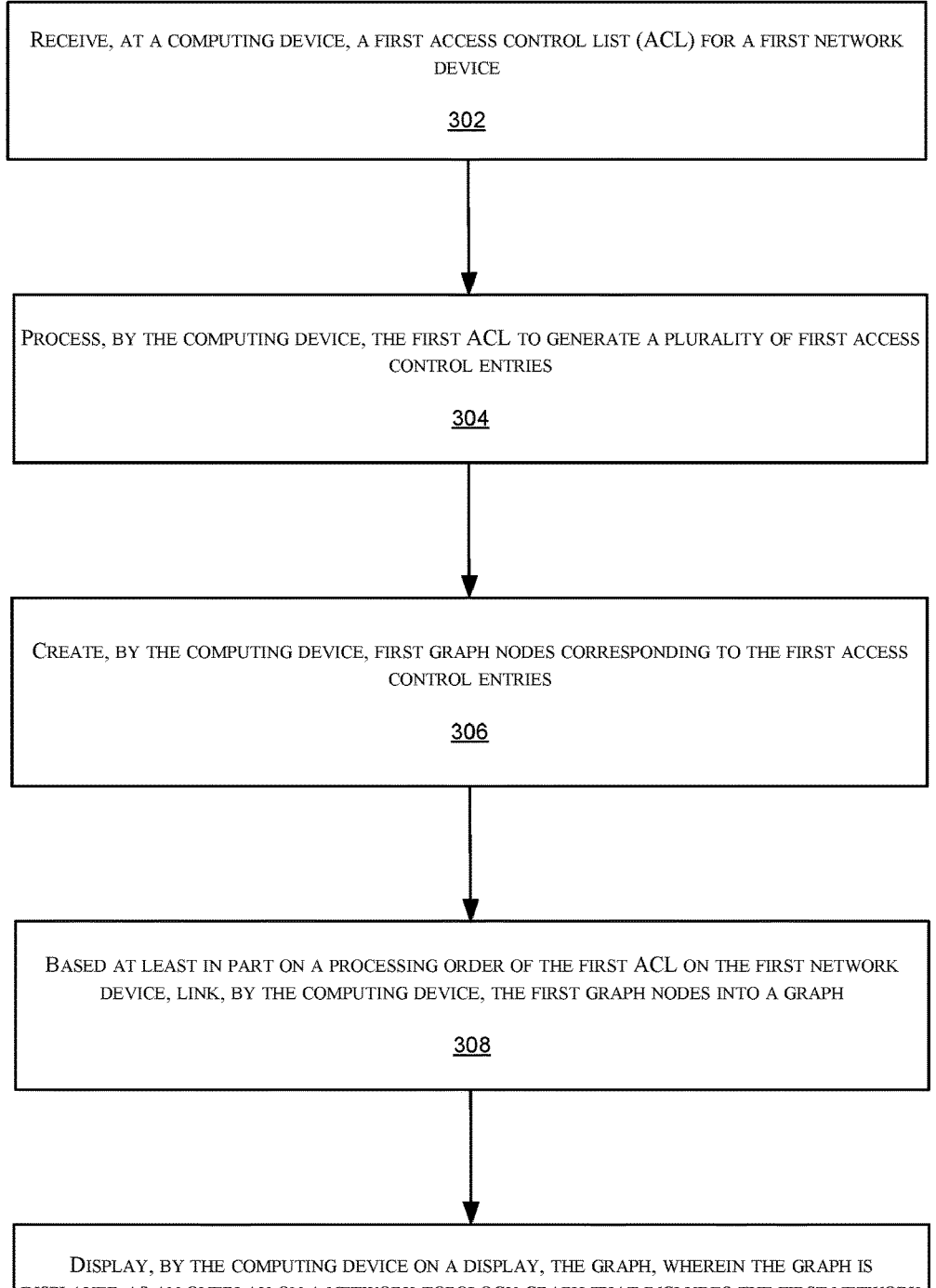

RECEIVE, AT A COMPUTING DEVICE, A FIRST ACCESS CONTROL LIST (ACL) FOR A FIRST NETWORK DEVICE

302

PROCESS, BY THE COMPUTING DEVICE, THE FIRST ACL TO GENERATE A PLURALITY OF FIRST ACCESS CONTROL ENTRIES

304

CREATE, BY THE COMPUTING DEVICE, FIRST GRAPH NODES CORRESPONDING TO THE FIRST ACCESS CONTROL ENTRIES

306

BASED AT LEAST IN PART ON A PROCESSING ORDER OF THE FIRST ACL ON THE FIRST NETWORK DEVICE, LINK, BY THE COMPUTING DEVICE, THE FIRST GRAPH NODES INTO A GRAPH

308

DISPLAY, BY THE COMPUTING DEVICE ON A DISPLAY, THE GRAPH, WHEREIN THE GRAPH IS DISPLAYED AS AN OVERLAY ON A NETWORK TOPOLOGY GRAPH THAT INCLUDES THE FIRST NETWORK DEVICE

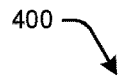
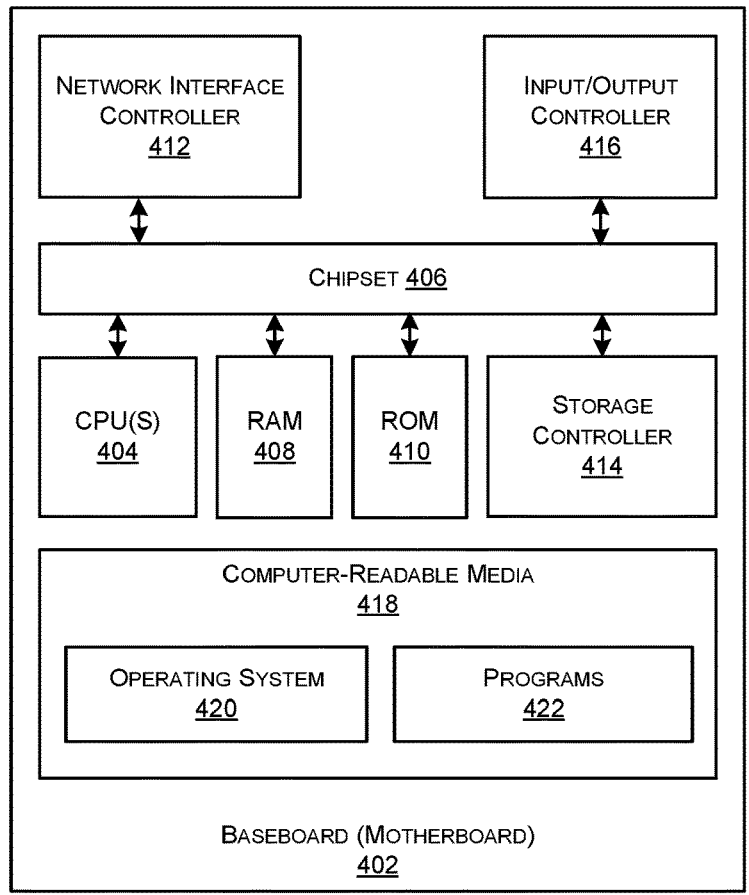
FIG. 4

CREATING GRAPHICAL MODELS OF NETWORK SECURITY POLICIES AND DISPLAYING ON A NETWORK TOPOLOGY GRAPH

CROSS-REFERENCE TO RELATED APPLICATION

This patent application claims priority to U.S. Provisional Patent Application No. 63/451,190, filed Mar. 9, 2023, which is fully incorporated herein by reference.

TECHNICAL FIELD

The present disclosure relates generally to a graphical representation of security policies, e.g., access control lists (ACLs), and more particularly, to abstracting a real physical twin network wherein the security policies are mapped as an overlay on a graphical representation of the network topology.

BACKGROUND

When creating digital twin representations of real networks, it is advantageous to create models of the security policy (e.g., ACLs) of network devices. Once an efficient model has been created, computations may be run against a modeled ACL and tests for network traffic may be performed, e.g., tests for determining traffic flow through the network and which packets may or may not be dropped by the network.

However, it generally is a complex process to create a net-new data structure to represent an ACL in memory. Existing security products use complicated red-black trees or compiled versions of the security policy for increased lookup times. These data structures however do not lend themselves to analysis and scrutiny.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for abstracting a real physical twin network wherein security policies are mapped as an overlay on a graphical representation of the network topology, in accordance with the techniques and architecture described herein.

FIG. 4 is a computer architecture diagram showing an example computer hardware architecture for implementing a device that can be utilized to implement aspects of the various technologies presented herein.

DESCRIPTION OF EXAMPLE EMBODIMENTS

Overview

Figure 1:
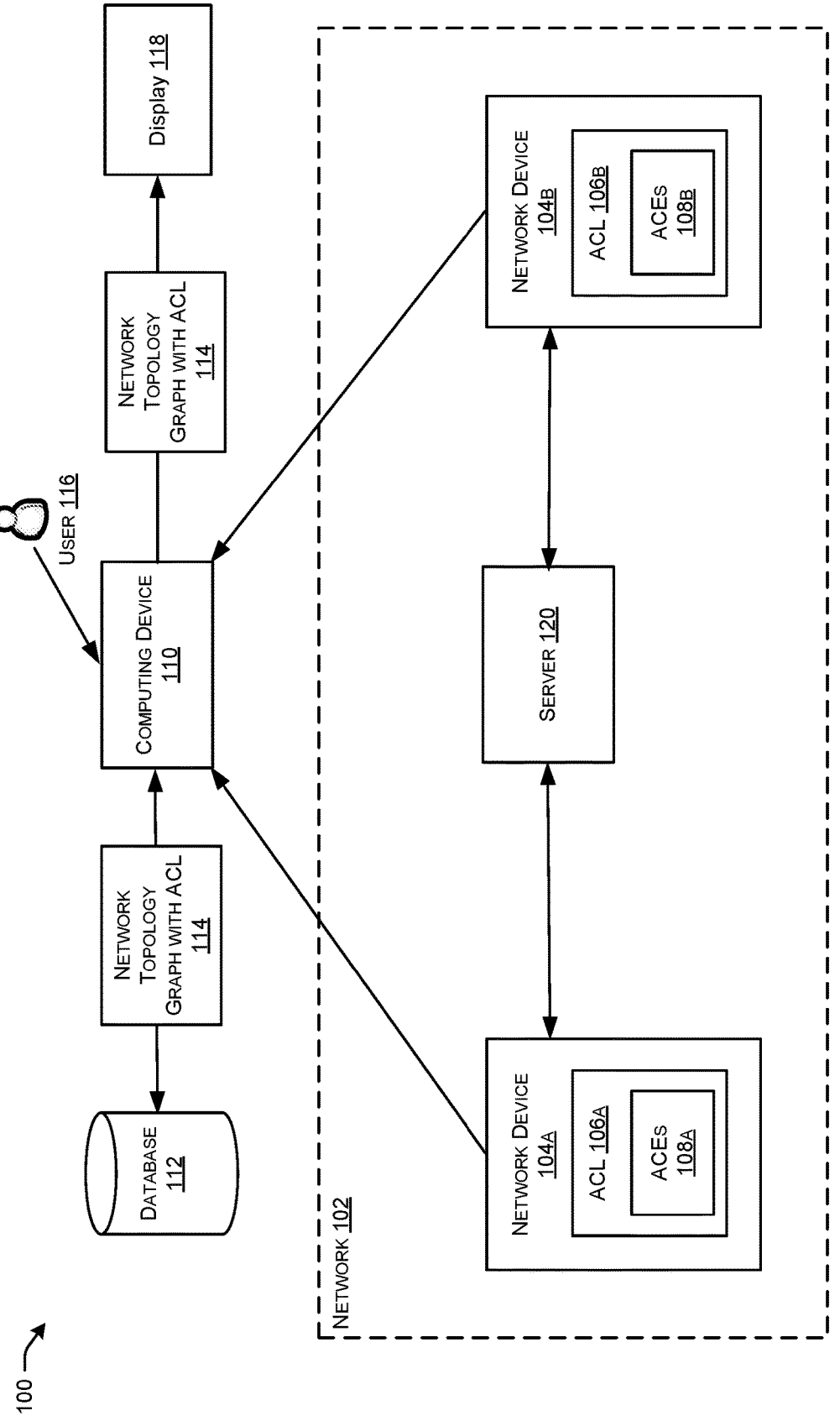
FIG. 1 schematically illustrates an example arrangement that includes a network that includes two network devices that each have security policies in the form of ACLs with corresponding ACEs that may be abstracted as a real physical twin network wherein the security policies are mapped as an overlay on a graphical representation of the network topology, in accordance with techniques and architecture described herein.

The present disclosure provides techniques and architecture for abstracting a real physical twin network. In particular, the techniques and architecture provide for parsing and normalizing data that is gathered from the network.

For example, commands may be gathered and/or shown from a network device, where the commands are from both a configuration state of the network device and an operational state of the network device. Relevant information may be gathered from the network device and pulled into a systems database. The data may be parsed, normalized (based at least in part on device vendor information) and then loaded into a graphical database. Once the security policy graph has been completed, the graph may be overlayed on a network topology graph pertaining to a network that includes the network device. Once the security graph is complete, a packet trace may be performed on the graph to model a network packet's flow through the network based on the security policies.

In particular, the techniques and architecture allow security policies, e.g., ACLs and corresponding access control entries (ACEs) to be added to a graph database along with specific ACL information that allows the system to then evaluate a packet against security policy to determine if the packet, when moving through the network, would be dropped. A key feature is the overlay of the device security policy into the same graph that represents the network topology. This reduces two different dimensions, e.g., the network topology and the security configuration, onto the same "plane" (graph). Such an arrangement allows for insights and calculations that are not easily possible using prior techniques.

As an example, a method may include receiving, at a computing device, a first security policy for a first network device. The computing device may process the first security policy to generate a plurality of first access control entries. The computing device may create first graph nodes corresponding to the first access control entries. Based at least in part on a processing order of the first security policy on the first network device, the computing device may link the first graph nodes into a graph. The computing device may display the graph on a display, wherein the graph is displayed as an overlay on a network topology graph that includes the first network device.

Example Embodiments

In accordance with configurations described herein, as previously noted, techniques and architecture are provided for abstracting a real physical twin network. In particular, the techniques and architecture provide for parsing and normalizing data that is gathered from the network and then presented in a graphical model as an overlay on a network topology graph.

For example, commands may be gathered and/or shown from a network device, where the commands are from both a configuration state of the network device and an operational state of the network device. Relevant information may be gathered from the network device and pulled into a systems database. The data may be parsed, normalized (based at least in part on device vendor information) and then loaded into a graphical database. Once the security policy graph has been completed, the graph may be overlayed on a network topology graph pertaining to a network that includes the network device. Once the security graph is complete, a packet trace may be performed on the graph to model a network packet's flow through the network based on the security policies.

In particular, the techniques and architecture allow security policies, e.g., ACLs and corresponding access control entries (ACEs) to be added to a graph database along with specific ACL information that allows the system to then evaluate a packet against security policy to determine if the packet, when moving through the network, would be dropped. A key feature is the overlay of the device security policy into the same graph that represents the network topology. This reduces two different dimensions, e.g., the network topology and the security configuration, onto the same "plane" (graph). Such an arrangement allows for insights and calculations that are not easily possible using prior techniques.

To create a graphical representation or model of an ACL (security policy) of a network device, in configurations, a method includes loading a native access-list configuration of a network device into a computing system, e.g., a computing device. The access-list configuration may be parsed and normalized (based at least in part on a vendor of the network device). The normalization allows for using data from different network devices regardless of the manufacturer of the network devices. In particular, by normalizing the security policy from different vendors of network devices and their corresponding network devices, the security policies may be evaluated holistically across multi-vendor eco systems. After normalization, the graph representation of the security policy may be compared between different vendors.

Additional information that may be normalized in a vendor neutral model for the ACL and access list entries (ACEs) on the network device may include the interface where the ACL is applied. Additionally, the directionality of the ACL (e.g., inbound, outbound, global), protocol, TCP-UDP ports, IP source, IP destination, logging, and additional packet options may also be part of the information that is normalized. Also, references to network servers and network services, as well as other entities on the network, may also be normalized.

The ACL may be flattened to generate a list of access control entries (ACEs). For each access control entry in the ACL, a graph node may be created with properties that describe the match parameters. Each node may then be linked together into a linked list matching the processing order of the network device for the ACEs.

A start of the linked list may be attached to an interface of the network device on which the linked list applies. A direction of flow of the access control entries within the ACL may also be included within the graph.

In configurations, when network servers or services are referenced in an access list entry, a linkage to the network server or service may be provided in the ACE. If the node does not currently exist, then a node for the network server or service may be created in the graphical model.

The ACL graphical model may be displayed as an overlay on a network topology model or graph of a network that includes the network device. In configurations, the ACL graph nodes of the ACL graphical model may be hidden until a user, e.g., an administrator, wants to investigate the ACL graph nodes. Additionally, the ACL graph nodes may be hidden until a path-trace has been initiated.

In configurations, the graph model of the ACL implements the ACEs as a link of nodes in the ACL graph with relationships connecting them as follows in the example of Table 1:

TABLE 1

```
(NODE)-[RELATIONSHIP]-(NODE)
(Interface)–>[HOSTED_ON]–>(Host)
(Interface)–>[NETWORK_SECURED_BY]–>(ACL)
(ACL)–>APPLIED_TO–>(Interface)
(ACL)–>[NETWORK_SECURED_BY]–>(first ACE entry)
(ACE)–>[NETWORK_SECURED_BY]–>(subsequent ACE entry)
(last ACE entry)–>[NETWORK_SECURED_BY]–>(ACL)
```

In configurations, application-based policies can also be illustrated in the combined graph. ACL destinations may be applications. Applications can also be represented by nodes that may be associated with physical servers that are running those applications. Additionally, web-based policies for products such as, for example, WSA (URL, HTTP method, reputation, etc.) may also be represented in the combined graph. DNS based policies for products such as, for example, umbrella (domain name, host name, reputation, etc.) may also be included. Also, trust SEC support can also be included.

Thus, in the combined graph system described herein, for building such combined models, the input may be raw output from various network device types. The collection of data may be orchestrated through an abstraction layer that interfaces with a given collector (CSPC, RADKIT, DNA center, etc.). Upon data ingestion, the data may be parsed and normalized into the graphical model. The output of the system may then be the combined graphical representation of the network topology and the security policy that would be a normalized data model across any given device type or device vendor.

Accordingly, in configurations, a method includes receiving, at a computing device, a first security policy for a first network device. The computing device processes the first security policy to generate a plurality of first access control entries. The computing device creates first graph nodes corresponding to the first access control entries. Based at least in part on a processing order of the first security policy on the first network device, the computing device links the first graph nodes into a graph. The computing device displays the graph on a display, wherein the graph is displayed as an overlay on a network topology graph that includes the first network device.

In configurations, processing the first security policy to generate the plurality of first access control entries comprises flattening the first security policy to generate the first access control entries and based at least in part on vendor information of the network device, normalizing the first access control entries.

In further configurations, displaying the graph comprises based at least in part on the processing order of the first security policy on the first network device, coupling an initial first graph node to an interface node representation of the first network device within the graph. In configurations, displaying the graph may further comprise based at least in part on the processing order of the first security policy on the first network device, indicating a direction among the first graph nodes.

In additional configurations, displaying the graph comprises based at least in part on receiving an input from a user interface (UI), displaying the graph as the overlay on the network topology graph that includes the first network device.

In configurations, the method further comprises receiving, at the computing device, a second security policy for a second network device and processing, by the computing device, the second security policy to generate a plurality of second access control entries. In such configurations, the method further comprises creating, by the computing device, second graph nodes corresponding to the second access control entries and based at least in part on a processing order of the second security policy on the second network device, linking, by the computing device, the second graph nodes into the graph. In such configurations, the method further comprises displaying, by the computing device on the display, the graph, wherein the graph is displayed as the overlay on the network topology graph that includes the first network device and the second network device.

In additional configurations, displaying the graph comprises based at least in part on the processing order of the first security policy on the first network device, coupling an initial first graph node to an interface node representation of the first network device within the graph. In such configurations, displaying the graph further comprises based at least in part on the processing order of the second security policy on the second network device, coupling an initial second graph node to an interface node representation of the second network device within the graph. In such configurations, displaying the graph further comprises based at least in part on the processing order of the first security policy on the first network device, indicating a direction among the first graph nodes and based at least in part on the processing order of the second security policy on the second network device, indicating a direction among the second graph nodes.

In configurations, at least one of a network server or a network service is included in the plurality of first access control entries and the method further comprises based at least in part on the at least one of the network server or the network service not being included in the network topology graph, adding a second graph node representing the at least one of the network server or the network service to the graph.

Thus, the graph database allows the digital twin model of the security policy and the network topology to be represented together. In particular, the network topology is represented as well as important policies of the network such as the access control lists. Some of the benefits provided include the result of computing a path-trace of a packet through the network that can be shown in just one topology overlay. The user can watch how a packet moves through the network and through the security policies in one view. Additionally, the nodes of the graph can be modified visually based on different factors such as a number of matches for permitting or denying (meaning the factors are actively affecting traffic). This could also highlight to the user which nodes are not matching "any" traffic, thereby indicating the nodes might be a shadowed rule. Furthermore, the administrator can then more easily and visually understand how the security policy is acting on traffic and adjust it accordingly.

Additional uses for the combined network topology and security policy graph include providing an avenue to intent based security policy across multi-vendor eco systems. Additionally, the combined graphs can lead to user-based identity. Furthermore, additional fields (such as, for example, user/group as the packet destination) may be included. Also, the AD user/groups as nodes in the graph can be represented in order to visualize the allowed flows on the single graph.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example arrangement 100 that includes a network 102 that includes two network devices 104a and 104b. Generally, as is known, the network 102 includes many network devices. Examples of network devices include, but are not limited to, routers, switches, etc.

Each network device 104a, 104b includes a corresponding security policy in the form of an access control list (ACL) 106a, 106b, respectively. Each ACL 106a, 106b includes corresponding access control entries (ACEs) 108a, 108b. Information, e.g., ACLs 106a, 106b and corresponding ACEs 108a, 108b, may be gathered by a computing device 110 from the network devices 104a, 104b. The computing device 110 represents a system that may include one or more servers, computers, etc. for processing information.

The computing device 110 may process the information obtained from the network devices 104a, 104b to create a graphical representation of each network device's security policies, e.g., a graphical representation or model of the ACLs 106a, 106b and corresponding ACEs 108a, 108b. The computing device 110 may also create a network topology graph of the network 102. A network topology graph with the ACL graphical representation 114 may be sent to a database 112.

When a user 116 wishes to display the network topology graph with the ACL graphical representation 114, the computing device 110 may pull the network topology graph with the ACL graphical representation 114 from the database 112 forward it to a display 118. In configurations, the display 118 may be part of the computing device 110.

In configurations, just the network topology graphical representation may be displayed on the display 118 initially. The user 116 may utilize a user interface (UI) (not shown) to then indicate that the user 116 wishes to have the ACL graphical representation displayed as an overlay on the network topology. The computing device 110, in response to the UI, may then display the ACL graphical representation as an overlay on the network topology graph.

In configurations, the network 102 may include a server 120 (or network service). The server 120 may be accessed by the network devices 104a, 104b. If the network topology graph does not include a node for the server 120, then the computing device 110 ACL graphical representation may add a corresponding node to the ACL graphical representation.

Thus, in configurations, the security policies for network devices 104 are loaded onto the same data structure as the topology of the network 102. The resulting graphical representation thus represents the network 102 and the relationship among the network devices 104. The network topology graph overlaid with the ACL graphical representation 114 allows for the user 116 to perform operations, such as, for example, packet traces. A packet may enter a network device 104 through the firewall of the network device and an interface of the network device. If there is an ACL 106 on the interface, then the next hop in the network topology and ACL graphical representation 114 is the ACL 106's various ACEs 108 in order. Thus, the packet is sent along the ACEs 108 of the ACL 106. This allows the user 116 to determine if the packet gets dropped or is permitted. If the packet is dropped at one of the ACE nodes, then the packet is sent back to the interface and the network device 104 can continue processing of the packet. Accordingly, a deny node means that the packet should be dropped. The dropping can be due to the type of packet, parameters, troubleshooting, because of the ACL replicating the behavior of the security policy, etc. Accordingly, the network topology graphical representation with the ACL graphical representation 114 allows the user 116 to additional users, additional network devices, etc., to the network topology graphical representation with the ACL graphical representation 114 and then analyze what may occur with respect to data packets in the network 102. The user 116 can thus make changes on the graph to ensure that a desired packet flow will work within the network 102. Changes within the network 102 and/or network devices 104 can thus accordingly be made based on the packet tracing using the graph model.

To create a graphical representation or model of an ACL (security policies) of network devices 104a, 104b, in configurations, a native ACL, for example ACL 106a of the network device 104a, is loaded into the computing device 110. The ACL106a may be parsed and normalized (based at least in part on a vendor of the network device 104a). The normalization allows for using data from different network devices regardless of the manufacturer of the network devices. In particular, by normalizing the security policy from different vendors of network devices and their corresponding network devices, the security policies may be evaluated holistically across multi-vendor eco systems. After normalization, the graph representation of the security policy may be compared between different vendors. Additional information that may be normalized in a vendor neutral model for the ACL and access list entries (ACEs) on the network device may include the interface where the ACL is applied. Additionally, the directionality of the ACL (e.g., inbound, outbound, global), protocol, TCP-UDP ports, IP source, IP destination, logging, and additional packet options may also be part of the information that is normalized. Also, references to network servers and network services, as well as other entities on the network, may also be normalized.

The ACL 106a may be flattened to generate a list of ACEs, (in this example ACEs 108a). For each ACE 108 in the ACL 106, a graph node may be created with properties that describe the match parameters. Each node may then be linked together into a linked list matching the processing order of the network device for the ACEs.

Figure 2A:
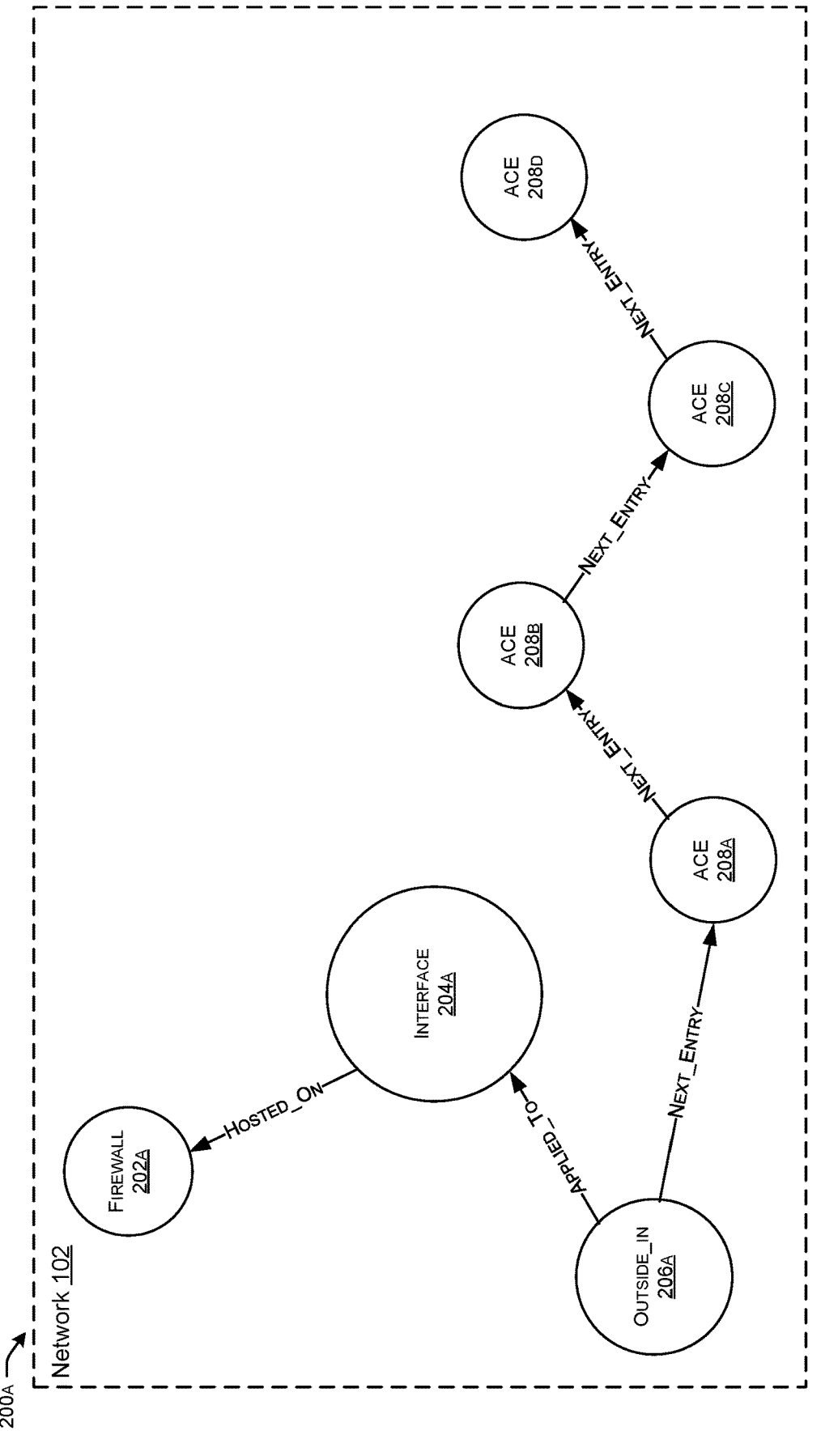
FIGS. 2A-2D schematically illustrate examples of graphical representations of security policies that are mapped as an overlay on graphical representations of a network topology, in accordance with techniques and architecture described herein.

FIG. 2A illustrates a graph 200a, e.g., ACL graphical model, that shows the parsed ACL 106a that has been normalized and that appears alongside a firewall 202a of a network device, e.g., network device 104a, to which it applies. In the graph 200a of FIG. 2A, the graph data structure may include an interface 204a (GigabitEthernet0) for the network device, e.g., the interface 204a is hosted on the network device. The ACL 206a, e.g., ACL 106a, (Outside_in) is also shown with links to the ACEs 208a-208d, e.g., ACEs 108a. Table 2 below illustrates an example of ACL 106a in accordance with the example format of Table 1 and FIG. 2A.

TABLE 2

| (NODE)-[RELATIONSHIP]-(NODE) |
| --- |
| (Interface 204)->[HOSTED_ON]->(Network Device 104a) |
| (Interface 204)->[NETWORK_SECURED_BY]->(ACL 106a) |
| (ACL 106a)->[APPLIED_TO->(Interface 204) |
| (ACL 106a)->[NETWORK_SECURED_BY]->(first ACE entry 208a) |
| (ACE)->[NETWORK_SECURED_BY]->(subsequent ACE entry 208b) |
| (ACE)->[NETWORK_SECURED_BY]->(subsequent ACE entry 208c) |
| (last ACE entry 208d)->[NETWORK_SECURED_BY]->(ACL 106a) |

A start, e.g., ACE node 208a, of the linked list may be attached to the interface 204a of the network device on which the linked list applies. A direction of flow of the ACEs 208 within the ACL 206a may also be included within the graph 200a.

The ACL graphical model 200a may be displayed as an overlay on a network topology model or graph of a network that includes the network device 104a. In configurations, the ACL graph nodes of the ACL graphical model may be hidden until the user 116, e.g., an administrator, wants to investigate the ACL graph nodes. Additionally, the ACL graph nodes may be hidden until a path-trace has been initiated.

Figure 2B:

As previously noted, in configurations, when network servers or services are referenced in an access list entry, a linkage to the network server or service may be provided in the ACE. If the node does not currently exist, then a node for the network server or service may be created in the graphical model. In particular, combining the network topology graph with the derived security policy graph 200, the "traditional" ACL 106a may be augmented in the graph model by infusing other types of information as nodes. For example, if ACE 208c refers to a server, the node 208c in the graph 200 may establish a link directly to that server entity 210 on the topology graph. This can be done with multiple types of nodes (network services, servers) of different types of abstracted network identities. FIG. 2B illustrates an example graph 200b with the server that has been inserted as a node 210 (webserver). This is done since a packet that satisfies at least one of ACEs 208a-208c permits traffic to the server 210. Thus, a node representing the server is created in the graph and a relationship "target" is formed. If a packet received on network device 104a does not satisfy at least one of ACEs 208a-208c, then the packet is dropped at ACE 208d and not forwarded to server 210.

In configurations, application-based policies can also be illustrated in the combined graph. ACL destinations may be applications. Applications can also be represented by nodes that may be associated with physical servers that are running those applications. Additionally, web-based policies for products such as, for example, WSA (URL, HTTP method, reputation, etc.) may also be represented in the combined graph. DNS based policies for products such as, for example, umbrella (domain name, host name, reputation, etc.) may also be included. Also, trust SEC support can also be included.

Figure 2C:

Now that the entity, e.g., server 210, referenced in the ACL 206a is inserted into the graph of FIG. 2B, analysis may now be performed. For example, it can be observed how two different access-list policies from different security devices reference the same entity on the network. This may be displayed in an explorer system as illustrated in FIG. 2C. For example, two different ACLs 106a, 106b from different network devices, e.g., network devices 104a, 104b, both route traffic to the same network server, e.g., the server node 210. This is represented natively in the graph 200c of FIG. 2C. The graph 200c that shows the parsed ACL 106a that has been normalized and that appears alongside a firewall 202a of a network device, e.g., network device 104a, to which it applies. In the graph 200c of FIG. 2C, the graph data structure may include an interface 204a (GigabitEthernet0) for the network device, e.g., the interface 204a is hosted on the network device. The ACL 206a, e.g., ACL 106a. (Outside_in) is also shown with links to the ACEs 208a-208d, e.g., ACEs 108a. The graph 200c that shows parsed ACL 106b that has been normalized and that appears alongside a firewall 202b of a network device, e.g., network device 104b, to which it applies. In the graph 200c of FIG. 2C, the graph data structure may include an interface 204b (GigabitEthernet0) for the network device, e.g., the interface 204b is hosted on the network device. The ACL 206b, e.g., ACL 106b, (Outside_in) is also shown with links to the ACEs 208e-208g, e.g., ACEs 108b. If a packet received on network device 104b does not satisfy at least one of ACEs 208e or 208f, then the packet is dropped at ACE 208g and not forwarded to server 210.

Path traces for packets may now be performed across both the network topology and the device security policy configuration as opposed to lookups against different policy tables. Reversed lookups may be performed and the system may be asked as to "what security policies reference this particular machine on the network." In this way, working backwards from the topology to the security policies that may affect packets within the network may be performed.

Figure 2D:
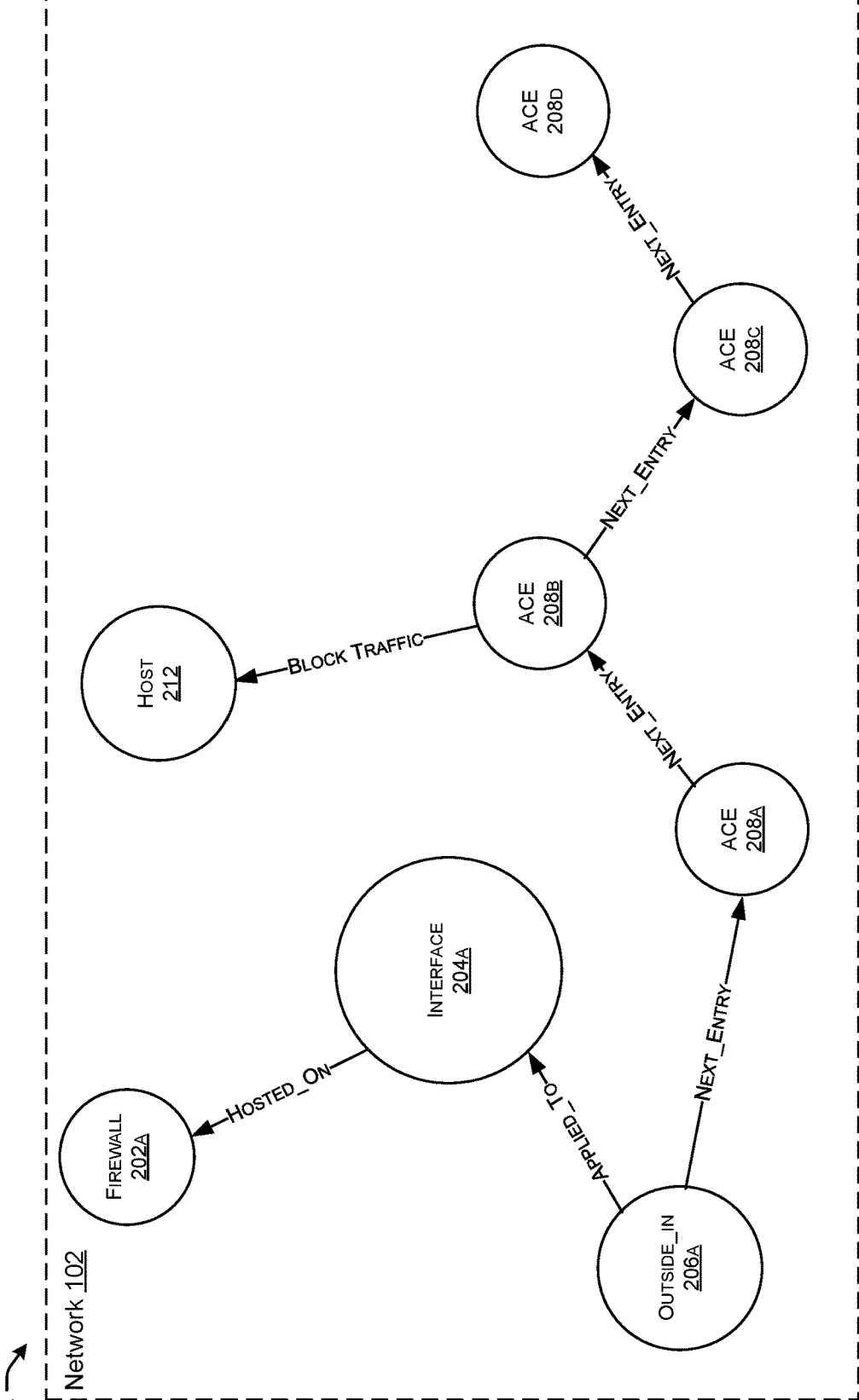

In another example, the security policy may be used to detect an incongruence between the network topology and the security policy. If the network 102 sees traffic from a host on the inside network that should not be within the network (according to the security policy), then a violation may be discovered and action may be taken. For example, FIG. 2D illustrates a graph 202d that includes a host 212 that is not supposed to be included within the network 102. In particular, the firewall 202a has an ACL, e.g., ACL 206a, that includes an ACE, e.g., ACE 208b, to block traffic to and/or from the host 212. Yet the host 212 appears in the network graph of FIG. 2D. Because the security policy and the network topology are on the graph of FIG. 2D together, this potential security breach is easy to spot.

In the combined graph system described herein, for building such combined models, the input may be raw output from various network device types. The collection of data may be orchestrated through an abstraction layer that interfaces with a given collector (CSPC, RADKIT, DNA center, etc.). Upon data ingestion, the data may be parsed and normalized into the graphical model. The output of the system may then be the combined graphical representation of the network topology and the security policy that would be a normalized data model across any given device type or device vendor.

FIG. 3 illustrates a flow diagram of an example method 300 and illustrates aspects of the functions performed at least partly by devices of a network as described with respect to FIGS. 1 and 2A-2D. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for abstracting a real physical twin network wherein security policies are mapped as an overlay on a graphical representation of the network topology. In some examples, the method 300 may be performed by a system comprising one or more processors and one or more non-transitory computer-readable media storing computer-executable instructions that, when executed by the one or more processors, cause the one or more processors to perform the method 300.

At 302, a computing device receives a first security policy for a first network device. For example, each network device 104a, 104b includes a corresponding security policy in the form of an access control list (ACL) 106a, 106b, respectively. Each ACL 106a, 106b includes corresponding access control entries (ACEs) 108a, 108b. Information, e.g., ACLs 106a, 106b and corresponding ACEs 108a, 108b, may be gathered by the computing device 110 from the network devices 104a, 104b. The computing device 110 represents a system that may include one or more servers, computers, etc. for processing information.

At 304, the computing device processes the first security policy to generate a plurality of first access control entries. For example, the ACLs 106a and/or 106b may be parsed and normalized (based at least in part on a vendor of the network device 104a and/or 104b). In particular, the ACL 106a may be flattened to generate a list of ACEs. The normalization allows for using data from different network devices regardless of the manufacturer of the network devices. In particular, by normalizing the security policy from different vendors of network devices and their corresponding network devices, the security policies may be evaluated holistically across multi-vendor eco systems. After normalization, the graph representation of the security policy may be compared between different vendors. Additional information that may be normalized in a vendor neutral model for the ACL and access list entries (ACEs) on the network device may include the interface where the ACL is applied. Additionally, the directionality of the ACL (e.g., inbound, outbound, global), protocol, TCP-UDP ports, IP source, IP destination, logging, and additional packet options may also be part of the information that is normalized. Also, references to network servers and network services, as well as other entities on the network, may also be normalized.

At 306, the computing device creates first graph nodes corresponding to the first access control entries. For example, the computing device 110 may process the information obtained from the network devices 104a, 104b to create a graphical representation of each network device's security policies, e.g., a graphical representation or model of the ACLs 106a, 106b and corresponding ACEs 108a, 108b. The computing device 110 may also create a network topology graph of the network 102. A network topology graph with the ACL graphical representation 114 may be sent to a database 112.

At 308, based at least in part on a processing order of the first security policy on the first network device, the computing device links the first graph nodes into a graph. For example, for each ACE 108 in the ACL 106, a graph node may be created with properties that describe the match parameters. Each node may then be linked together into a linked list matching the processing order of the network device for the ACEs.

At 310, the computing device displays the graph on a display, wherein the graph is displayed as an overlay on a network topology graph that includes the first network device. For example, the ACL graphical model 200a may be displayed as an overlay on a network topology model or graph of a network that includes the network device 104a. In configurations, the ACL graph nodes of the ACL graphical model may be hidden until the user 116, e.g., an administrator, wants to investigate the ACL graph nodes. Additionally, the ACL graph nodes may be hidden until a path-trace has been initiated.

Thus, the techniques and architecture provide for a digital twin model of a security policy and a network topology to be represented together. In particular, the network topology is represented as well as important policies of the network such as the access control lists. Some of the benefits provided include the result of computing a path-trace of a packet through the network that can be shown in just one topology overlay. The user can watch how a packet moves through the network and through the security policies in one view. Additionally, the nodes of the graph can be modified visually based on different factors such as a number of matches for permitting or denying (meaning the factors are actively affecting traffic). This could also highlight to the user which nodes are not matching "any" traffic, thereby indicating the nodes might be a shadowed rule. Furthermore, the administrator can then more easily and visually understand how the ACL policy is acting on traffic and adjust it accordingly.

In particular, the techniques and architecture address the situation where a network administrator must view multiple tools to view the most important aspects of their network: topology and security policy. The techniques and architecture described herein brings these concepts together in one place in an intuitive way. The methods described herein scale up and prove very useful, especially for much more complex networks and security policies. By including the network topology and the security policies onto the same data structure, compelling capabilities may be unlocked such as, for example: (i) analysis: Observe how a packet/flow moves through the network and the security policy in one motion, explaining how traffic will be treated by the network in one shot: (ii) intent validation: The vendor agnostic security policy allows one to compare device security policies directly against the original intent of the policy: for example two perimeter firewalls from different vendors are both programmed with similar security policies, and with this system it is easy to confirm if they have the same behavior; and (iii) translation: The system can translate policies from one vendor to another.

Additional uses for the combined network topology and security policy graph include providing an avenue to intent based security policy across multi-vendor eco systems. Additionally, the combined graphs can lead to user-based identity. Furthermore, additional fields (such as, for example, user/group as the packet destination) may be included. Also, the AD user/groups as nodes in the graph can be represented in order to visualize the allowed flows on the single graph.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the example arrangement 100. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a computing device, a first security policy for a first network device;
   processing, by the computing device, the first security policy to generate a plurality of first access control entries;
   creating, by the computing device, first graph nodes corresponding to the first access control entries;

based at least in part on a processing order of the first security policy with respect to the first access control entries on the first network device, linking, by the computing device, the first graph nodes into a graph, wherein the graph includes a direction of flow of the access control entries within the first security policy;

displaying, by the computing device on a display, the graph, wherein the graph is displayed as an overlay on a network topology graph that includes the first network device; and based on the graph displayed on the display, detecting an incongruence between the network topology and the first security policy, wherein the incongruence relates to a presence of a host within the network topology graph, and wherein the host is not supposed to be included within the network topology graph based on the first security policy.

2. The method of claim 1, wherein processing the first security policy to generate the plurality of first access control entries comprises:

flattening the first security policy to generate the first access control entries; and based at least in part on vendor information of the network device, normalizing the first access control entries.

3. The method of claim 1, wherein displaying the graph comprises:

based at least in part on the processing order of the first security policy with respect to the first access control entries on the first network device, coupling an initial first graph node to an interface node representation of the first network device within the graph; and based at least in part on the processing order of the first security policy with respect to the first access control entries on the first network device, indicating a direction among the first graph nodes.

4. The method of claim 1, wherein displaying the graph comprises:

based at least in part on receiving an input from a user interface (UI), displaying the graph as the overlay on the network topology graph that includes the first network device.

5. The method of claim 1, further comprising:

receiving, at the computing device, a second security policy for a second network device;

processing, by the computing device, the second security policy to generate a plurality of second access control entries;

creating, by the computing device, second graph nodes corresponding to the second access control entries;

based at least in part on a processing order of the second security policy with respect to the second access control entries on the second network device, linking, by the computing device, the second graph nodes into the graph, wherein the graph includes a second direction of flow of the second access control entries within the second security policy; and displaying, by the computing device on the display, the graph, wherein the graph is displayed as the overlay on the network topology graph that includes the first network device and the second network device.

6. The method of claim 5, wherein displaying the graph comprises:

based at least in part on the processing order of the first security policy with respect to the first access control entries on the first network device, coupling an initial first graph node to an interface node representation of the first network device within the graph;

based at least in part on the processing order of the second security policy with respect to the second access control entries on the second network device, coupling an initial second graph node to an interface node representation of the second network device within the graph;

based at least in part on the processing order of the first security policy with respect to the first access control entries on the first network device, indicating a direction among the first graph nodes; and based at least in part on the processing order of the second security policy with respect to the second access control entries on the second network device, indicating a direction among the second graph nodes.

7. The method of claim 5, wherein displaying the graph comprises:

based at least in part on receiving an input from a user interface (UI), displaying the graph as the overlay on the network topology graph that includes the first network device.

8. The method of claim 1, wherein at least one of a network server or a network service is included in the plurality of first access control entries and the method further comprises:

based at least in part on the at least one of the network server or the network service not being included in the network topology graph, adding a second graph node representing the at least one of the network server or the network service to the graph.

9. A system comprising:

one or more processors; and one or more non-transitory computer-readable media storing computer-executable instructions that, when executed by the one or more processors, cause the one or more processors to perform actions comprising:

receiving, at a computing device, a first security policy for a first network device;

processing, by the computing device, the first security policy to generate a plurality of first access control entries;

creating, by the computing device, first graph nodes corresponding to the first access control entries;

based at least in part on a processing order of the first security policy with respect to the first access control entries on the first network device, linking, by the computing device, the first graph nodes into a graph, wherein the graph includes a direction of flow of the access control entries within the first security policy;

displaying, by the computing device on a display, the graph, wherein the graph is displayed as an overlay on a network topology graph that includes the first network device; and based on the graph displayed on the display, detecting an incongruence between the network topology and the first security policy, wherein the incongruence relates to a presence of a host within the network topology graph, and wherein the host is not supposed to be included within the network topology graph based on the first security policy.

10. The system of claim 9, wherein processing the first security policy to generate the plurality of first access control entries comprises:

flattening the first security policy to generate the first access control entries; and based at least in part on vendor information of the network device, normalizing the first access control entries.

11. The system of claim 9, wherein displaying the graph comprises:

based at least in part on the processing order of the first security policy with respect to the first access control entries on the first network device, coupling an initial first graph node to an interface node representation of the first network device within the graph; and based at least in part on the processing order of the first security policy with respect to the first access control entries on the first network device, indicating a direction among the first graph nodes.

12. The system of claim 9, wherein displaying the graph comprises:

based at least in part on receiving an input from a user interface (UI), displaying the graph as the overlay on the network topology graph that includes the first network device.

13. The system of claim 9, wherein the actions further comprise:

receiving, at the computing device, a second security policy for a second network device;

processing, by the computing device, the second security policy to generate a plurality of second access control entries;

creating, by the computing device, second graph nodes corresponding to the second access control entries;

based at least in part on a processing order of the second security policy with respect to the second access control entries on the second network device, linking, by the computing device, the second graph nodes into the graph, wherein the graph includes a second direction of flow of the second access control entries within the second security policy; and displaying, by the computing device on the display, the graph, wherein the graph is displayed as the overlay on the network topology graph that includes the first network device and the second network device.

14. The system of claim 13, wherein displaying the graph comprises:

based at least in part on the processing order of the first security policy with respect to the first access control entries on the first network device, coupling an initial first graph node to an interface node representation of the first network device within the graph;

based at least in part on the processing order of the second security policy with respect to the second access control entries on the second network device, coupling an initial second graph node to an interface node representation of the second network device within the graph;

based at least in part on the processing order of the first security policy with respect to the first access control entries on the first network device, indicating a direction among the first graph nodes; and based at least in part on the processing order of the second security policy with respect to the second access control entries on the second network device, indicating a direction among the second graph nodes.

15. The system of claim 13, wherein displaying the graph comprises:

based at least in part on receiving an input from a user interface (UI), displaying the graph as the overlay on the network topology graph that includes the first network device.

16. The system of claim 9, wherein at least one of a network server or a network service is included in the plurality of first access control entries and the actions further comprise:

based at least in part on the at least one of the network server or the network service not being included in the network topology graph, adding a second graph node representing the at least one of the network server or the network service to the graph.

17. One or more non-transitory computer-readable media storing computer-executable instructions that, when executed by one or more processors, cause the one or more processors to perform actions comprising:

receiving, at a computing device, a first security policy for a first network device;

processing, by the computing device, the first security policy to generate a plurality of first access control entries;

creating, by the computing device, first graph nodes corresponding to the first access control entries;

based at least in part on a processing order of the first security policy with respect to the first access control entries on the first network device, linking, by the computing device, the first graph nodes into a graph, wherein the graph includes a direction of flow of the access control entries within the first security policy;

displaying, by the computing device on a display, the graph, wherein the graph is displayed as an overlay on a network topology graph that includes the first network device; and based on the graph displayed on the display, detecting an incongruence between the network topology and the first security policy, wherein the incongruence relates to a presence of a host within the network topology graph, and wherein the host is not supposed to be included within the network topology graph based on the first security policy.

18. The one or more non-transitory computer-readable media of claim 17, wherein processing the first security policy to generate the plurality of first access control entries comprises:

flattening the first security policy to generate the first access control entries; and based at least in part on vendor information of the network device, normalizing the first access control entries.

19. The one or more non-transitory computer-readable media of claim 17, wherein displaying the graph comprises:

based at least in part on the processing order of the first security policy with respect to the first access control entries on the first network device, coupling an initial first graph node to an interface node representation of the first network device within the graph; and based at least in part on the processing order of the first security policy with respect to the first access control entries on the first network device, indicating a direction among the first graph nodes.

20. The one or more non-transitory computer-readable media of claim 17, wherein displaying the graph comprises:

based at least in part on receiving an input from a user interface (UI), displaying the graph as the overlay on the network topology graph that includes the first network device.

* * * * *